United States Patent [19]

Shu

[11] Patent Number: 4,680,705
[45] Date of Patent: Jul. 14, 1987

[54] AUTOMATIC DATA RESTRUCTURER

[75] Inventor: Nan-Chiang Shu, Rolling Hills, Calif.

[73] Assignee: International Business Machines Corporation, Armonk, N.Y.

[21] Appl. No.: 775,868

[22] Filed: Sep. 13, 1985

[51] Int. Cl.⁴ .............................................. G06F 9/00
[52] U.S. Cl. .................................................... 364/300
[58] Field of Search ... 364/200 MS File, 900 MS File, 364/300

[56] References Cited

U.S. PATENT DOCUMENTS 4,044,334 8/1977 Bachman et al. .................... 364/200

Primary Examiner—Raulfe B. Zache
Attorney, Agent, or Firm—R. Bruce Brodie

[57] ABSTRACT

A method for generating object code which represents a conformance of input data structures into that of a prespecified output data structure such that at runtime data in the input structures can be embedded into the output structure. At least some of the input and output structures have some common fields but differ in the distribution of the hierarchical and repeated groups of said fields. The method utilizes graphical models for characterizing the prespecified forms and a series of operations based upon the difference in the complexity and distribution of the graphs for conforming the input structure to that of the output.

9 Claims, 18 Drawing Figures

EXAMPLE OF PRESPECIFIED INPUT AND OUTPUT
DATA STRUCTURES, WITH REFERENCE TO THE
HIERARCHICAL LEVELS OF THE COMPONENTS

METHOD FOR DETERMINING THE "SHAPE" OF THE
DATA STRUCTURE OF A GIVEN INPUT OR OUTPUT

TEST TO DETERMINE WHETHER AN OUTPUT CAN
BE PRODUCED BY "TRIMMING" A GIVEN INPUT

TEST TO DETERMINE WHETHER AN OUTPUT CAN BE
PRODUCED BY "FLATTENING" A GIVEN INPUT OR
BY "FLATTENING" FOLLOWED BY "TRIMMING"

TEST TO DETERMINE WHETHER AN OUTPUT IS
"STRETCHABLE" FROM A GIVEN INPUT

TEST TO DETERMINE WHETHER HYBRIDIZATION IS NECESSARY
WHEN TESTS IN FIGURES 4, 5, AND 6 HAVE FAILED

HYBRIDIZATION

DECOMPOSITION STAGE:

RECURSIVELY, (1) DECOMPOSE AN OUTPUT STRUCTURE INTO ITS SUBTREES.

(2) FOR EACH SUBTREE, DEFINE AN INTERMEDIATE FILE CONSISTING OF THE SUBTREE CONCATENATED WITH ITS PARENT KEY FIELD(S).

(3) TREAT EACH INTERMEDIATE FILE AS A TEMPORARY OUTPUT:

FOLLOW THE STEPS DEPICTED IN FIGURES 3 THROUGH 7.

IF HYBRIDIZATION IS NECESSARY TO FORM THE TEMPORARY OUTPUT, INITIATE THE DECOMPOSITION RECURSIVELY.

OTHERWISE, MARK THE TEMPORARY OUTPUT WITH THE OPERATIONS DETERMINED IN FIGURES 4 THROUGH 7.

SYNTHESIS STAGE:

(1) IN A TOP-DOWN, LEFT-TO-RIGHT ORDER, GENERATE CODE TO PRODUCE TEMPORARY OUTPUTS BASED ON THE OPERATIONS MARKED DURING THE DECOMPOSITION STAGE.

(2) GENERATE CODE TO GRAFT THE TEMPORARY OUTPUTS PAIRWISE, IN A BOTTOM-UP, RIGHT-TO-LEFT ORDER, UNTIL THE DESIRED OUTPUT CAN BE PRODUCED.

HYBRIDIZATION FLOW

FIG. 8

INPUT:

| (EMPLOYEE) | | | | | |
|---|---|---|---|---|---|
| ENO | NAME | DNO | PJNO | DESCRIPTION | LOC |

FLAT

OUTPUT:

| (DEPTMENT) | | | | | |
|---|---|---|---|---|---|
| DNO | ( EMP ) | | | ( PROJECTS ) | |
| | ENO | NAME | (PROJ) | PJNO | DESCRIPTION |
| | | | PJNO   LOC | | |

TREE

EXAMPLE OF INPUT AND OUTPUT STRUCTURES
OF RESPECTIVELY A FLAT AND TREE FORM

FIG. 9

HYBRIDIZATION

DECOMPOSITION STAGE:

(1) DECOMPOSE OUTPUT STRUCTURE INTO SUBTREES

| ( EMP ) |||| 
|---|---|---|---|
| ENO | NAME | (PROJ) ||
| | | PJNO | LOC |

| ( PROJECTS ) ||
|---|---|
| PJNO | DESCRIPTION |

(2) CONCATENATE WITH PARENT KEYS

| ( EMP ) |||||
|---|---|---|---|---|
| DNO | ENO | NAME | (PROJ) ||
| | | | PJNO | LOC |

| ( PROJECTS ) |||
|---|---|---|
| DNO | PJNO | DESCRIPTION |

(3) MARK (EMP) AS STRETCHABLE       MARK (PROJECTS) AS TRIMMABLE
    FROM EMPLOYEE                                           FROM EMPLOYEE

SYNTHESIS STAGE:

(1) EMPLOYEE ——— TRIMMING ———→ PROJECTS

EMPLOYEE ——— STRETCHING ———→ EMP (2) EMP ———┐
               ├——— GRAFTING ———→ DEPTMENT
   PROJECTS ——┘ ( MATCHING ON DNO )

HIGHLIGHTS OF THE DECOMPOSITION AND SYNTHESIS PHASES OF
HYBRIDIZATION WHEN THE METHOD OF FIGURE 8 IS APPLIED
UPON INPUT AND OUTPUT STRUCTURES SHOWN IN FIGURE 9

FIG. 10

|  | | INPUT FORM | | |
|---|---|---|---|---|
|  | | FLAT | BRANCH | TREE |
| O U T P U T  F O R M | FLAT | TRIMMING | TRIMMING IF ALL ESSENTIAL SOURCE COMPONENTS ARE AT ROOT LEVEL; OTHERWISE<br><br>FLAT_TRIM | ERROR MESSAGE IF ESSENTIAL SOURCE COMPONENTS BELONG TO 2 OR MORE BRANCHES; OTHERWISE<br>FLATTENING IF THERE IS NO SKIPPING OF LEVELS FROM SOURCE; OTHERWISE<br>FLATTENING FOLLOWED BY TRIMMING |
|  | BRANCH | STRETCHING | TRIMMING IF THERE IS NO CHANGE IN HERITAGE; OTHERWISE<br>STRETCHING IF EXPANSION OF LEVELS OCCURS ONLY FROM ROOT (TOP) LEVEL, AND THERE ARE NO HERITAGE CHANGES AMONG OTHER COMPONENTS; OTHERWISE<br>FLAT_TRIM (AS ABOVE) FOLLOWED BY STRETCHING. |  |
|  | TREE | HYBRIDIZATION |  | TRIMMING IF NO HERITAGE CHANGES; OTHERWISE<br>STRETCHING IF LEVEL EXPANSION OCCURS FROM ROOT LEVEL, AND NO HERITAGE CHANGES FROM OTHER COMPONENTS; OTHERWISE<br>HYBRIDIZATION |

TABLE TO DEFINE TRANSFORMATION STRATEGIES FOR ONE INPUT

FIG. 11

INPUTS:

| (DIRECTRY) | | |
|---|---|---|
| ENO | NAME | PHONE |

| (DEP) | | | | |
|---|---|---|---|---|
| DNO | MGR | DIV | (EMP) | |
| | | | ENO | JC |

OUTPUT:

| (RESDIR) | | | |
|---|---|---|---|
| NAME | PHONE | ENO | DNO |

SPECIFICATION:

| | (RESDIR) | | | |
|---|---|---|---|---|
| | NAME | PHONE | ENO | DNO |
| SOURCE | DIRECTRY | | | DEP |
| MATCH | DEP.ENO, DIRECTRY.ENO | | | |

EXAMPLE OF A TWO-INPUT, SINGLE-OUTPUT DATA
RESTRUCTURING PROBLEM WHERE THE MATCHING
FIELD, ENO, IS AT ROOT LEVEL OF OUTPUT

FIG. 12

METHOD FOR PRODUCING ONE OUTPUT FROM TWO INPUTS WHERE
ALL MATCHING FIELDS APPEAR AT ROOT LEVEL OF OUTPUT (1) FORM SUBPARTS FROM OUTPUT STRUCTURE

| (SUBPART1) | | |
|---|---|---|
| NAME | PHONE | ENO |

| (SUBPART2) | |
|---|---|
| ENO | DNO |

(2) PREGRAFTING OPERATIONS

| (DIRECTRY) | | |
|---|---|---|
| ENO | NAME | PHONE |

↓ TRIMMING

| (DEP) | | | (EMP) | |
|---|---|---|---|---|
| DNO | MGR | DIV | ENO | JC |

↓ FLATTENING

| (SUBPART1) | | |
|---|---|---|
| NAME | PHONE | ENO |

| (SUBPART2) | |
|---|---|
| DNO | ENO |

(3)

↓ GRAFTING

| ( RESDIR ) | | | |
|---|---|---|---|
| NAME | PHONE | ENO | DNO |

RESULTS OF OPERATIONS SPECIFIED IN FIGURE 13 UPON THE
INPUT AND OUTPUT STRUCTURES SHOWN IN FIGURE 12

FIG. 14

INPUTS:

| (DIRECTRY) | | |
|---|---|---|
| ENO | NAME | PHONE |

| (DEP) | | | | |
|---|---|---|---|---|
| DNO | MGR | DIV | (EMP) | |
| | | | ENO | JC |

OUTPUT:

| (RESDIR2) | | | |
|---|---|---|---|
| DNO | (EMP) | | |
| | NAME | ENO | PHONE |

SPECIFICATION:

| (RESDIR2) | | | | |
|---|---|---|---|---|
| | DNO | (EMP) | | |
| | | NAME | ENO | PHONE |
| SOURCE | DEP | DIRECTRY | | |
| MATCH | DEP.ENO, DIRECTRY.ENO | | | |

EXAMPLE OF PRESPECIFIED INPUT AND OUTPUT STRUCTURES
WHERE THE MATCHING FIELD, ENO, IS NOT
AT THE ROOT LEVEL OF THE OUTPUT

FIG. 15

```
┌─────────────────────────────────────────────┐
│ DEFINE THE STRUCTURE OF A TEMPORARY FILE, TEMP, │
│ BY COPYING THE STRUCTURE OF THE TARGET OUTPUT,  │
│ FOLLOWED BY PUSHING ALL MATCHING FIELDS TO THE  │
│ ROOT LEVEL, CARRYING SIBLINGS AND DESCENDENTS   │
│ OF MATCHING FIELDS ALONG.                       │
│                      │                          │
│                      ▼                          │
│ FOLLOW FIGURE 13 FOR THE CREATION OF TEMP BY    │
│ GRAFTING TWO INPUTS WHERE ALL MATCHING FIELDS   │
│ ARE AT ROOT LEVEL.                              │
│                      │                          │
│                      ▼                          │
│ APPLY STRETCHING TO TRANSFORM THE TEMPORARY     │
│ FILE TEMP INTO THE DESIRED FINAL OUTPUT.        │
└─────────────────────────────────────────────┘
```

METHOD FOR PRODUCING ONE OUTPUT FROM TWO
INPUTS WHERE NOT ALL MATCHING FIELDS
APPEAR AT THE ROOT LEVEL OF OUTPUT

FIG. 16

(1) DEFINE AN INTERMEDIATE FILE WITH MATCHING FIELD
    (AND ITS SIBLINGS) AT ROOT LEVEL

| (TEMP) | | | |
|---|---|---|---|
| DNO | NAME | ENO | PHONE |

(2) FOLLOW FIGURE 13, TREATING TEMP1 AS OUTPUT (A) FORM SUBPARTS, INCLUDE MATCHING FIELD IN BOTH SUBPARTS:

| (SUBPART1) | |
|---|---|
| DNO | ENO |

| (SUBPART2) | | |
|---|---|---|
| NAME | ENO | PHONE |

(B) TRANSFORM INPUTS INTO THE INTERMEDIATE FILES
       (I.E. THE TWO SUBPARTS AS SHOWN ABOVE):

AUTOMATIC DATA RESTRUCTURER

TECHNICAL FIELD

This invention relates to a method for generating object code, which code at execute time conforms an input data structure into that of a prespecified output data structure, and more particularly in which at least some of the input and the output structures have at least some common fields but differ in the distribution of the hierarchical and repeating groups of said fields.

BACKGROUND OF THE INVENTION

Most information processing involves data restructuring of varying degrees. When data are extracted from sources or new fields are created and placed in the output, the resulting output structure is often different from the structure of the input sources. Furthermore, the increasing need to access and to extract information stored in the various disparate or distributed systems makes data restructuring a necessary part of automatic information processing.

Special languages providing high-level operators for data restructuring have been reported in Shu et al, "EXPRESS: A Data Extraction, Processing and REStructuring System", ACM Transactions on Data Base Systems, Vol. 2, No. 2, June 1977, pp. 134–174; and in Kitagawa et al, "Form Document Management System SPECDOQ—Its Architecture and Implementation", Proceedings of the Second ACM-SIGOA Conference on Office Information Systems, June 1984, pp. 132–142. However, these languages, though "high level", are still "procedural". In order to utilize these languages, it is still necessary to formulate the methods of restructuring in a step-by-step, usually hand-driven or hand-created manner.

THE INVENTION

It is an object of this invention to automate the process by which data restructuring can be accomplished. It is a further object to remove the reformulation of the automatic data restructuring capability from the point in time when said data restructuring can actually be invoked.

The aforementioned objects are satisfied by a method which utilizes graphical models for characterizing the prespecified forms and a series of operations based upon the difference in the complexity and distribution of the graphs for conforming the input structure to that of the output. More particularly, the method of this invention as illustrated is utilized in an information processing system where the input and output data structures are prespecified.

The method for generating object code for conforming the input data into the output data structure comprises the steps of (a) ascertaining the shape of a given input and output data structure as being either (1) a flat form, (2) a one-branch form, or (3) a tree form; (b) determining the minimal operations selected from the set of trimming, flattening, grafting, or stretching so as to conform the input into the output data structure according to the difference in ascertained shapes; (c) determining each instance when a selected operation is to be invoked from a defining table; and (d) executing the order of operations specified by steps (a) through (c) upon said input data structure.

Step (c) is further modified in the case where the output data structure is more complex than the input structure. In such a circumstance, the output structure is recursively decomposed into its component flat, one-branch, or tree forms. This recursive decomposition continues until each of the subcomponents of the output structure can be obtained by a basic operation on the input data structure. Lastly, step (d) is modified such that the subcomponents are combined step by step to synthesize the desired final output structure.

In the art, Schneiderman and Thomas, "An Architecture for Automatic Relational Data Base Systems Conversion", ACM TODS, June 1982, and IBM Publication GIM GC26-4070, "Data Extract (DXT)", published April 1984, together with the IBM DOS RPG II, involve "hierarchic" data by distributing it to lower levels. However, these references neither teach nor suggest that the steps of shape difference based on graphical decomposition, together with a set of operation primitives, could redistribute any input data structure to conform to a prespecified output data structure.

Bachman et al, U.S. Pat. No. 4,130,867, "Database Instruction Apparatus for Determining a Database Record Type", issued Dec. 19, 1978, and Berry et al, U.S. Pat. No. 4,429,372, "Method for Integrating Structured Data and String Data on a Text Processing System", issued Jan. 31, 1984, are cited to show the state of the patented art in which recognition of input data type for purposes of document integration, such as Berry, or of a data base file, such as Bachman, is for the purpose of facilitating CPU resource use and processing.

In the word processor of Berry, the output format is that of an infinite tape in which both mixed and variable length files must be appropriately concatenated. In Bachman, the file structure characterization identifies the necessary processing elements involved with the accessing and processing of the file. Most significantly, nowhere is there addressed the problem of conforming of data structures involving the redistribution of hierarchic and repeated groups of fields, as is the case in this invention.

BRIEF DESCRIPTION OF THE DRAWING

FIG. 8 sets out the hybridization flow.

FIG. 9 represents an illustrative example of input and output prespecified structures of respectively a flat and a tree form.

FIG. 10 highlights the decomposition and synthesis phases of hybridization.

FIG. 11 sets out a defining table which determines in each instance when a selected operation is to be invoked, or, where the output data structure is more complex than the input, decomposition of the output structure into its component forms then ensues.

FIG. 12 highlights a two-input, single-output data structure conversion problem.

FIG. 14 shows the results of the operations specified in FIG. 13 upon the input and output structures shown in FIG. 12.

FIG. 15 depicts input and output data structures whose matching fields are not at the root level of output.

FIG. 16 is a flow diagram of the method for producing one output from two inputs where not all matching fields appear at the root level of output.

DESCRIPTION OF THE PREFERRED EMBODIMENT AND INDUSTRIAL APPLICABILITY

Figure 1:
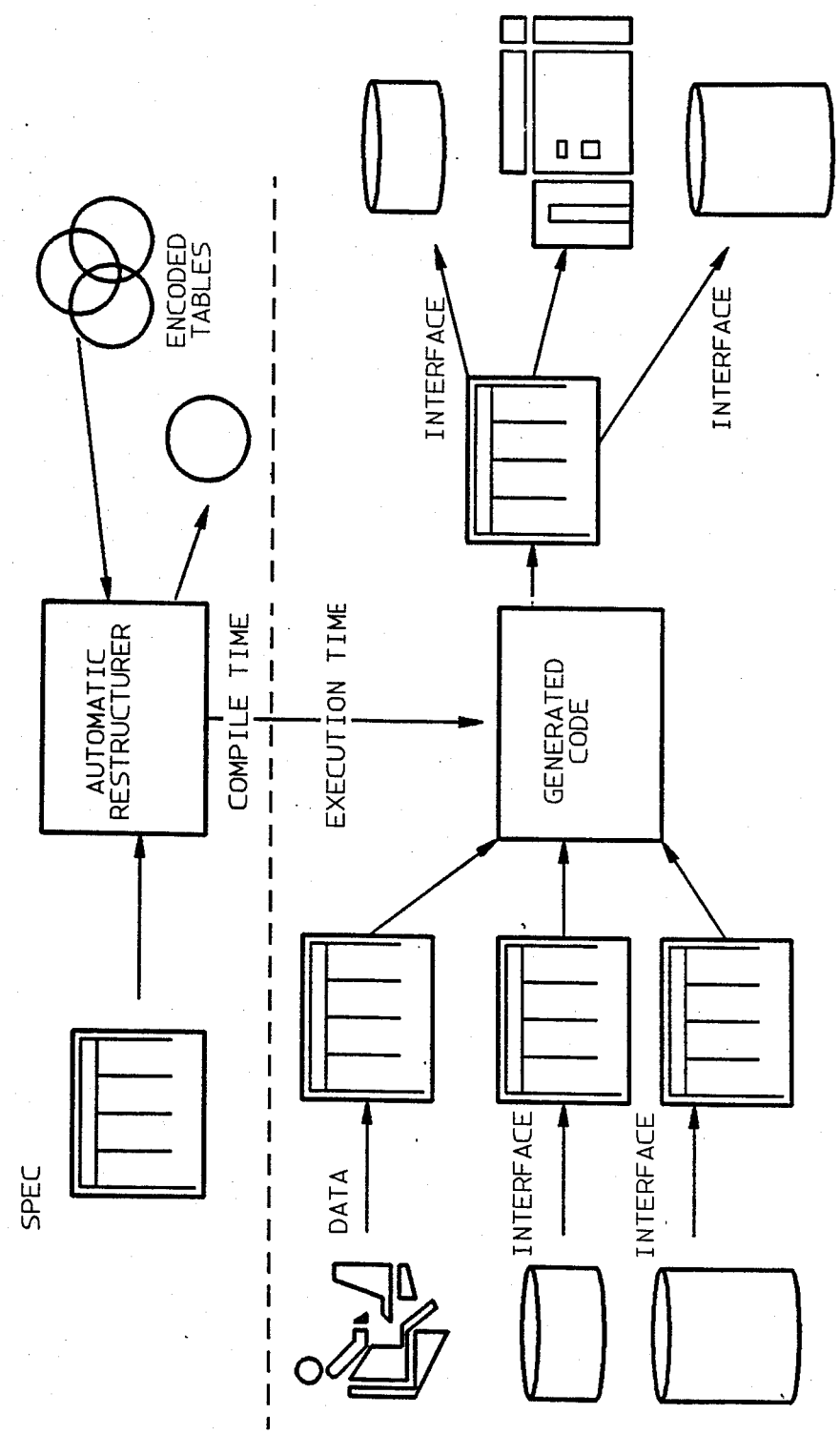
FIG. 1 is a high-level conceptualization of automatic data restructuring in the nature of compilation, together with the subsequent use of the object code resulting from the method of this invention, to accomplish actual restructuring at run or execution time.

Given an unambiguous description of an output format, sources for the components of the output, an unambiguous description for each of the inputs, and the match fields to tie the inputs, the method of this invention will generate executable object code to carry out data restructuring caused by the differences of the output and input data structures. Note, that the inputs and output may have hierarchical structures of arbitrary complexity. If selection criteria and desired ordering of instances are made known, the tailored object code will also perform the requested selection and sorting while the output form is being constructed. These relationships are depicted at a very general level in FIG. 1.

In this invention, four types of operations are used for data restructuring. The data model is a tree, a graph of no cycles. The nomenclature consists of the now well-appreciated terms from forest management. The operations include trimming, flattening, stretching, and grafting. These operations are not in and of themselves the subject of this invention; however, their combinatorial use is. The operations were adopted from the IBM program product No. 5796-PLH described in the manual "Define and Convert" as publication SH20-2178, published July 1979.

The trimming operation cuts away unwanted fields and/or groups from a data structure. That is, it extracts data from an input and places such data into the output without any alteration in existing hierarchical relationships between or among fields. Arithmetic and string functions can be performed on the extracted data before the resulting value is placed in a predetermined output field. Further, if a condition has been specified, only input instances of data that satisfy the condition will be used to construct the output instances.

The flattening operation transforms an input branch into a flat form by propagating parent key values along a hierarchical path. A flat form means a form in which the structure has no repeating groups. Also, the stretching operation expands the levels of a hierarchy by factoring out key values from the root level of an input structure. Lastly, the grafting operation combines two hierarchies horizontally to form a wider hierarchy by matching the value of matched fields at the root (top) level.

In the method of this invention, the first step is ascertaining the shapes of the data structures of the relevant files. Data structures are classified into three different shapes, i.e. flat, one-branch, or tree form. Shape determination proceeds by traversing the descriptions of the components and identifying any repeating groups of fields. During the traversal, the number of repeating groups of fields is counted, and the maximum level of repeating groups of fields is recorded. Since the level number of repeating groups of fields increases with the nesting of said fields, one of three cases can occur when the traversal is completed.

Case One. If the count of repeating groups is zero, the data structure is "flat".

Case Two. If the count of repeating groups equals the maximum level of the repeating groups, there is only one repeating group at each level. Consequently, the data structure is a "one-branch form".

Case Three. Otherwise, the number of repeating groups is greater than the maximum level of repeating groups. In other words, at least one level must have more than one repeating group. The shape of this structure is a "tree form".

Complexities of flat, one-branch, and tree structures are ranked 1, 2, and 3, respectively. Relative complexities of the input and output structures have a bearing on the manner in which the method generates object code.

In considering the method of this invention where only one input structure is involved, it is necessary to determine whether the required restructuring, after the shapes and complexity of the input and output structure have been determined, can be accomplished by basic operations. The basic operations are (1) trimming, (2) flattening, (3) flattening followed by trimming, (4) stretching, or (5) case two or three followed by stretching. These five basic operations are termed "first order operations".

Figure 4:
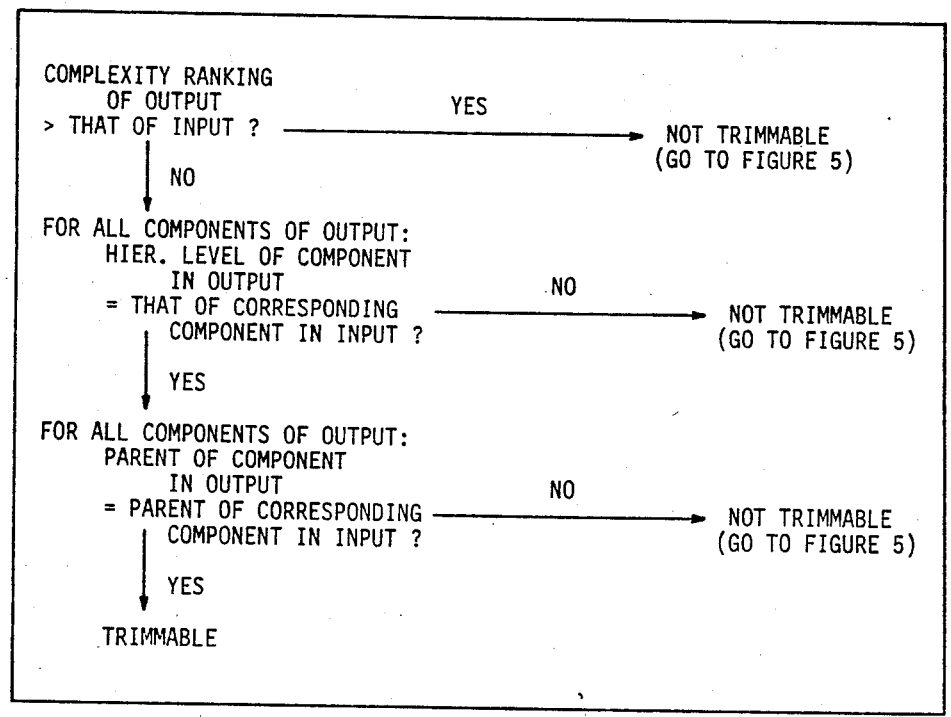
FIGS. 4–6 represent aspects of determining the minimal operations according to the difference in the ascertained shapes.

Referring now to FIG. 4, there is shown the test to determine whether an output can be produced by "trimming" a given input. To be "trimmable", the hierarchical relationships among components must not be disturbed during restructuring. That is, there must be no change of heritage, even though positioning of components within a group of fields may be altered. Significantly, some of the fields and/or groups of fields may be omitted, and new fields may be derived and added to the output.

Figure 2:
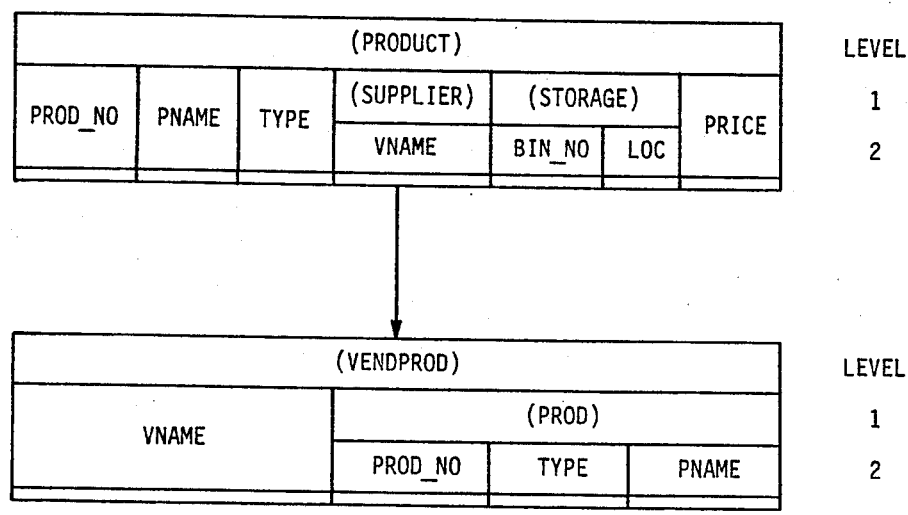
FIG. 2 sets out an example of prespecified input and output data structures with a reference to nesting level.
Figure 3:
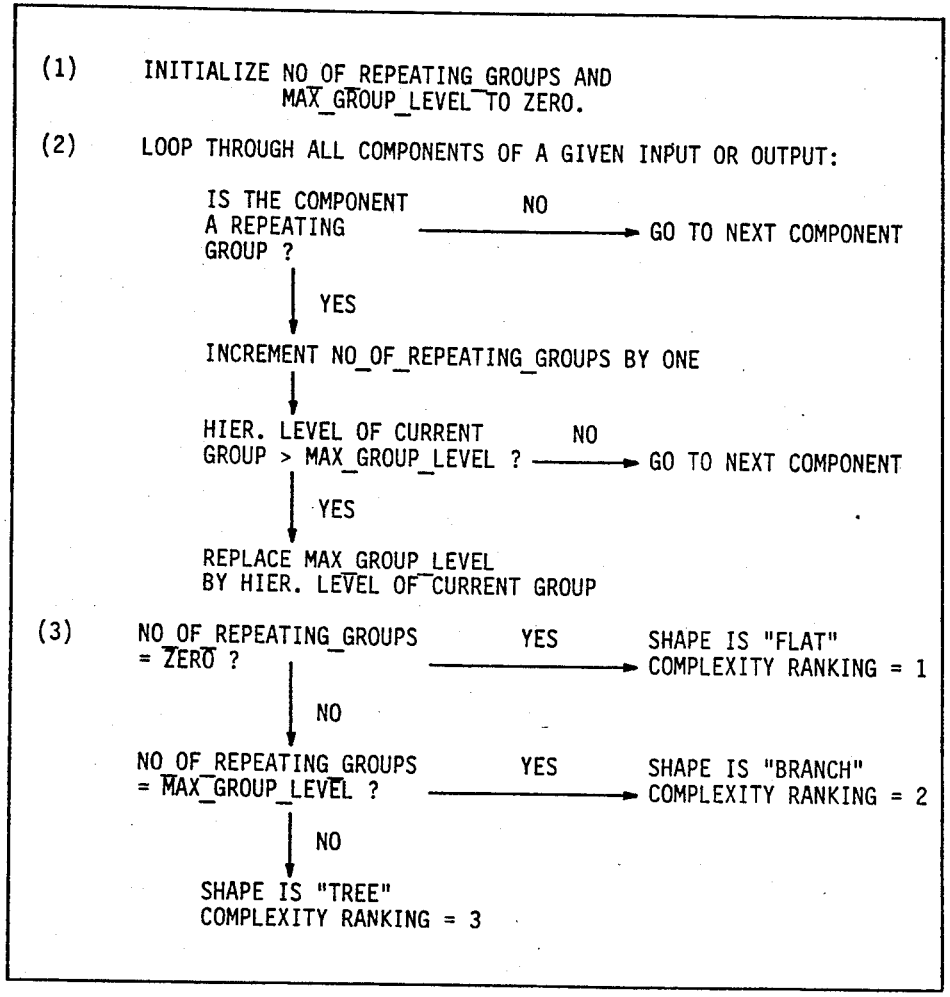
FIG. 3 shows a flow diagram of the method for determining the shape of the data structure for a prespecified input and output.

Referring now to FIG. 2 and taken together with FIG. 4, it is apparent that the object is to ascertain whether the output structure can be formed from the input structure utilizing the trimming operation. In the first instance, trimming might be invoked where the complexity of the input structure is greater than that of the output structure. Note, in FIG. 2, that the input is a tree whereas the output form is that of a one-branch. Consequently, the input complexity exceeds that of the output structure. Consideration must be given to the next test since the trimming operation is a possibility. The next test contemplates whether there are any hierarchical level changes among the input and output fields. In FIG. 2, in the input structure, for example, the product number field is at the root level, whereas the product number field is at a second level in the output structure. Clearly, there is hierarchical change. As a consequence, the trimming operation is not possible. Since it has been determined that the output is not trimmable, it next should be ascertained whether it is susceptible to flattening.

Figure 5:
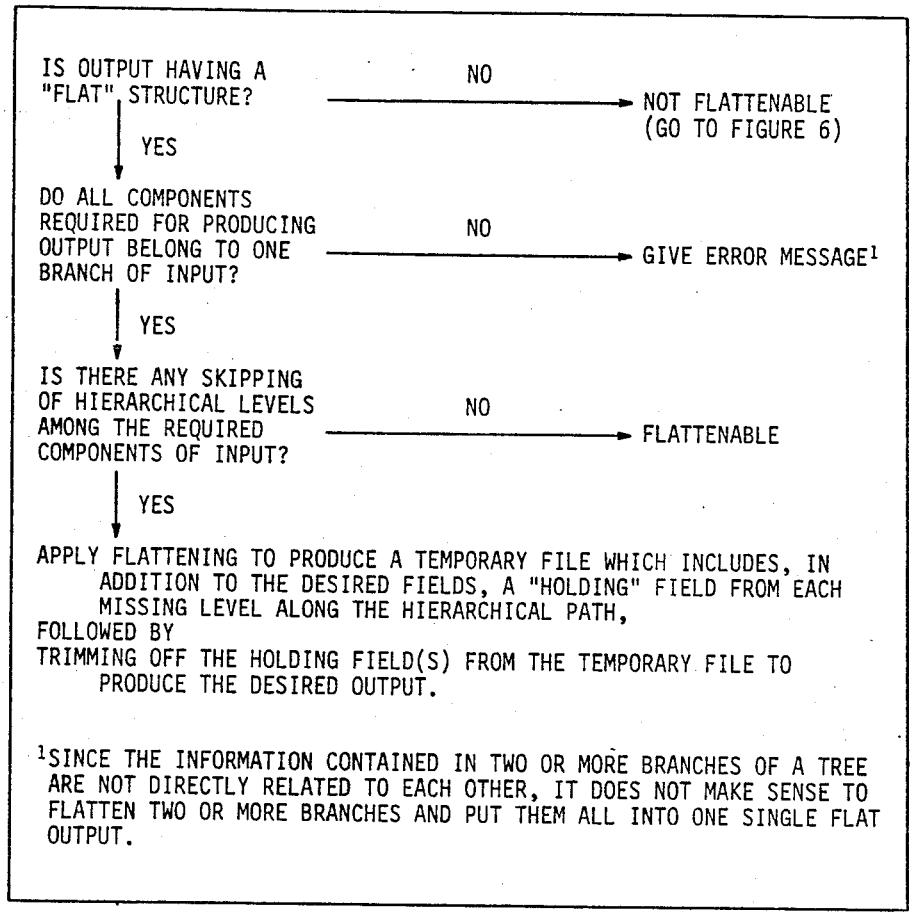

Referring now to FIG. 5, it is the case that if the output is flat, the flattening operation will be a natural candidate. Two conditions in addition to flatness must be satisfied. The first condition is that the source components essential for the creation of the output structure must belong to a single branch. This source branch can be either a branch form or a branch within a tree-shaped form. The second condition is that at least one field of the input structure must be extracted from each hierarchical level along the branch. Referring now to FIG. 2 and taken together with FIG. 5, if the output does not have a flat structure, it is clearly not the object of the flattening operation. However, in the event that an output does have a flat structure, it must be subject to several additional tests to ascertain its suitability. Now, if all of the components required for producing the output do not belong to one branch of the input structure, an error message to the system is provided. In the case where two or more branches of the tree are not directly related to one another, no advantage is seen in flattening two or more branches and putting them into a single flat output structure. When all of the components do belong to one branch in the input, the next test is whether there is any skipping of hierarchical levels among the required components of input. If there is no avoidance or skipping of levels, then flattening is suitable. Consider, for example, an input structure having three levels of hierarchy of field x with child y and with grandchild z and an output structure in which only x and z are present. This involves a skipping of a hierarchical level and is not flattenable. However, if two operations were to be considered, one could flatten a hierarchical input x, y, and z into a flat output form and then subject the flattened form to trimming to reduce the fields to only x and z.

Figure 6:
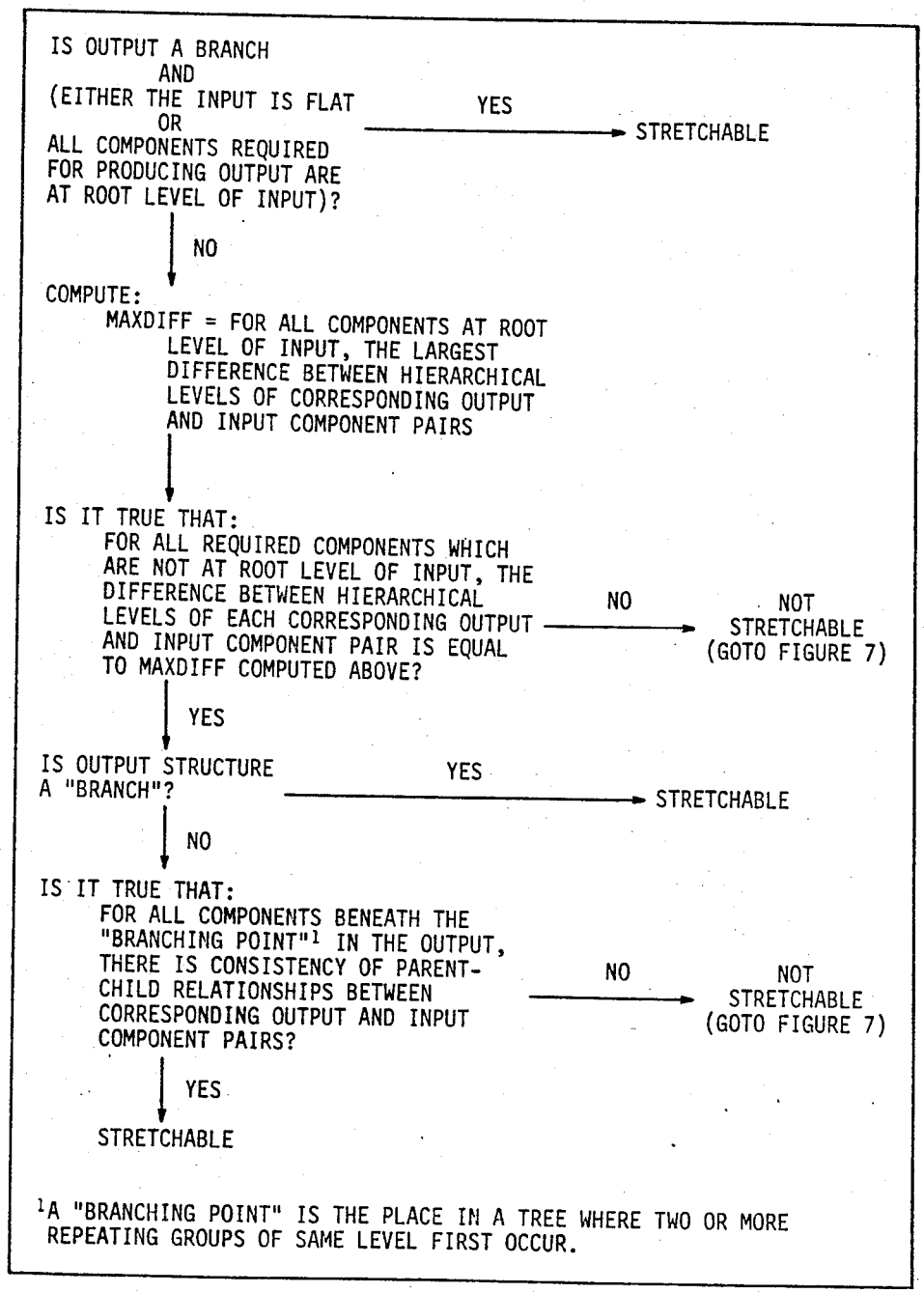

Referring now to FIG. 2 when taken together with FIG. 6, there is shown a test for ascertaining the possibility of using stretching. Stretching is involved where it is necessary that (1) an expansion of new hierarchical level occurs from and only from the root level fields of the source form; and (2) other than those components participating in (1), corresponding output and input component pairs exhibit "consistent" hierarchical relationships. As an example, if at the root level in the input structure there existed fields x, b, and c, then a stretch would involve placing x, b, and c hierarchically in the output structure. Referring again to FIG. 2 and taken together with FIG. 6, it should be noted that where there are hierarchical differences among the fields in both the input and output structures, a comparison match must be made for ascertaining whether any expansion occurs from and only from the root level fields of the source form. For instance, in FIG. 2, fields PROD_NO, PNAME, and TYPE are at level 1, whereas in the output form they are at level 2. The maximum difference is $2-1=1$. Now, going on to the second test shown in FIG. 6, it is necessary to examine the difference in level between those fields in the input structure below the root level and the correspondents, if any, in the output structure. In FIG. 2, these would be such fields as VNAME, BIN_NO, and LOC. These are at level 2 in the input structure. However, VNAME appears at level 1 in the output structure. The difference is $1-2=-1$. Since this is not the same difference of level computed with reference to the MAXDIF, then the output structure is not stretchable.

Figure 7:
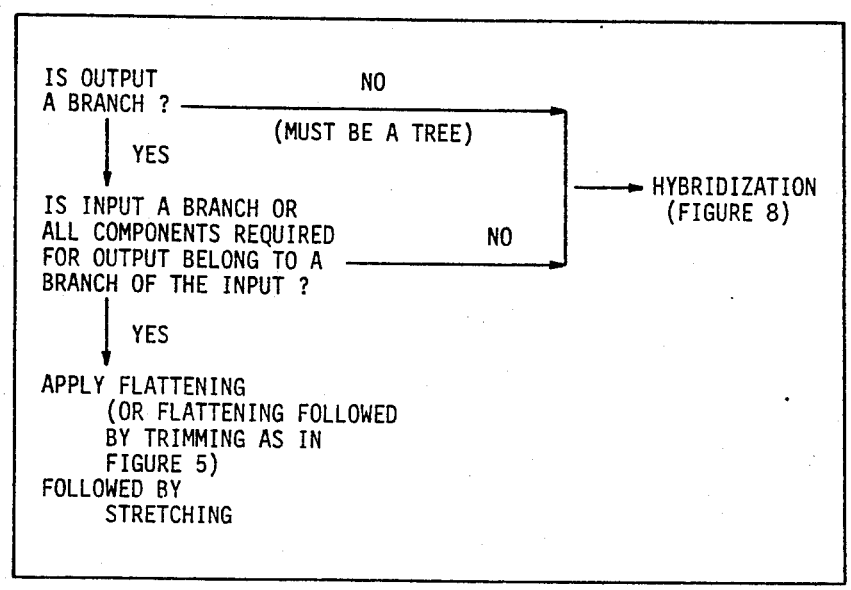
FIG. 7 depicts the test to determine whether hybridization is necessary.

Referring now to FIG. 7, as of the time it is determined by the method that stretching is inapplicable, the shapes of the data structures again come into play. When the output structure is a branch and the input structure is either a branch or all components essential for the creation of the output belong to a single branch of the input tree, transformation can be accomplished by a flattening operation following by stretching. Otherwise, the method proceeds with a hybridization strategy. In the illustration of FIG. 2, hybridization is not necessary because all components of the output required belong to a branch of the input structure, and flattening followed by stretching is possible.

Referring now to FIG. 11, there is shown a defining table which determines in each instance when a selected operation is to be invoked or where the output data structure is more complex than the input. In such latter circumstance, hybridization may be invoked. Referring now to FIG. 8, there is shown the hybridization flow. Hybridization involves two stages. These stages are decomposition and synthesis. At the decomposition stage, the output data structure is decomposed into its subtrees (i.e. repeating groups of fields). Each of the subtrees concatenated with parent key fields is then treated as an intermediate file and compared with its counterpart in the input. Since these subtrees are components of the targeted output structure, they have simpler structures. It is likely that the data structures of the intermediate files are also simpler than the input and the basic operations can be applied. In case hybridization is required for the production of any of the intermediate files, decomposition is applied recursively until eventually the basic operations can be invoked. Consequently, the method of this invention is able to mark all intermediate files with the operations required.

At the completion of the decomposition phase, the synthesis stage begins. Essentially, the operations (marked during the decomposition phase) are applied to produce the intermediate files from the input in a top-to-bottom, left-to-right order. The intermediate files are then grafted pairwise in a bottom-up, right-to-left order until the desired output structure can be produced. Grafting of two intermediate files is indistinguishable from the grafting of two input data structures.

Referring now to FIG. 9 when taken together with FIG. 10, there is depicted in FIG. 9 an input and output data structure of respectively a flat and tree form. Clearly, the output structure is substantially more complex than the input. Since hybridization requires a decomposition phase, it is necessary to decompose the more complex (output) structure into subtrees. These are then concatenated with parent keys. Parent keys are used to tie together the subtrees. In the synthesis stage, it is desired in a top-down, left-to-right order to generate a code to produce temporary outputs based on the operations marked during the decomposition stage. The next step is to take the temporary outputs pairwise in a bottom-up, right-to-left order until a desired output can be produced. Note, in FIG. 10, the parent key is the DNO and the operations of trimming, stretching, and grafting are used to attain the desired output structure.

As previously mentioned, a grafting operation ties two hierarchies side by side by matching the value of correspondingly matching fields of the input structures. As a basic operation, the matching fields must be extracted from the root level of both inputs and must appear at the root level of the output structure. Furthermore, except for the elimination of the matching fields of the second input from the output structure, schematically, each of the input structures is carried in its entirety into the output structure. No restructuring of any part is allowed during this operation. Thus, if the user-specified input structure is not the "desired" input structure to a grafting operation, then transformation from the prespecified input to the desired input must be performed before grafting. It should be remembered that grafting ties two input structures side by side. Complexity enters into the fact that data structures having the complexity of trees, for example, may be involved.

Figure 13:
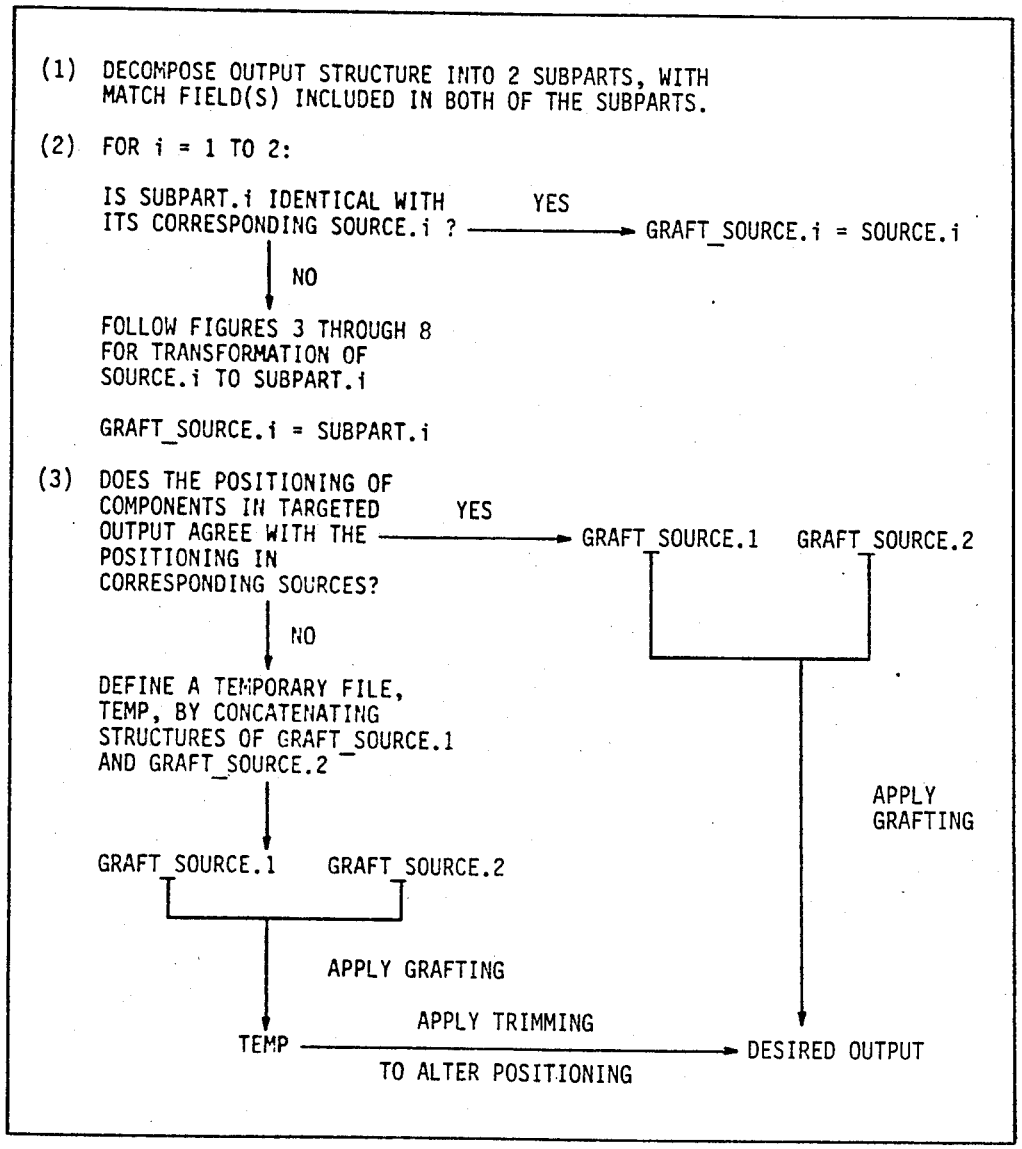
FIG. 13 shows a flow diagram for producing one output from the two inputs where all matching fields appear at root level of the output structure.

Referring now to FIGS. 12, 13, and 14, there are illustrated examples of grafting operations. According to the flow diagram of FIG. 13, the decomposition phase proceeds by suitable tests.

Referring now to FIG. 13, at the point when all matched fields appear at the root level of the output structure, it is shown that the output data structure is decomposed into two subparts with matched fields included in both of the subparts. Each of the subparts is then compared with its corresponding source file to determine whether it is necessary to perform some pre-grafting operations.

If the subpart is identical to its corresponding source, then the source file can be used directly as the desired input structure to the grafting operation. Otherwise, the subpart other than the source file is treated as a desired input to said grafting operation. The method must consider the strategy of transforming a source file into this subpart. The problem is now reduced to creating an intermediate file from only one input structure. This has been previously described. When both of the desired input structures are ready, a grafting operation may then be performed. As previously pointed out, a grafting operation ties two input structures side by side. Thus, when components from two source files are neatly separated from each other in the output, a grafting operation is able to produce the user-specified output. However, if the components from the two inputs are interspersed in the user-specified output structure, it would be necessary to designate an intermediate form as output of the grafting operation. In this regard, a trimming operation would have to be applied so that positioning of the components could be rearranged according to the user's specification of the targeted output. For example, assume input 1 contains x, y, z and input 2 contains x, a, b. Grafting input 1 with input 2, matched on x, produces x, y, z, a, b. In the case where the prespecified output is x, y, b, a, z, a trimming operation following the said grafting would be necessary.

Referring now to FIG. 12, taken together with FIGS. 13 and 14, it is shown that the prespecified output structure contains NAME, PHONE, and ENO from DIRECTRY as source, and DNO from DEP as source. Including the matching field, ENO, two subparts (as shown in FIG. 14) are formed. When these two subparts are compared with the prespecified inputs, it is obvious that neither subpart can be used directly as the desired input to the grafting operation to produce the prespecified output. Following the methods described previously, it is shown that SUBPART1 can be transformed from DIRECTRY by a trimming operation, whereas SUBPART2 can be transformed from DEP by a flattening operation. Grafting SUBPART1 with SUBPART2 gives the output as prespecified, thus no more operation is needed after grafting.

Figure 17A:
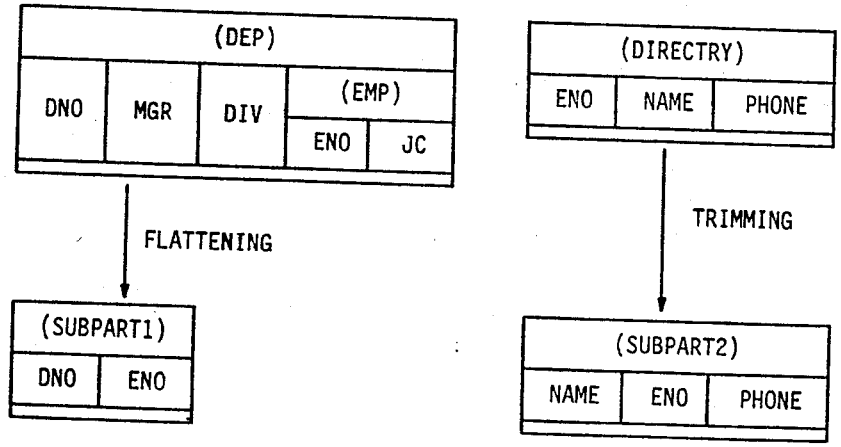
FIGS. 17A and 17B illustrates the results of the steps shown in FIG. 16 operable upon the example set out in FIG. 15.
Figure 17B:
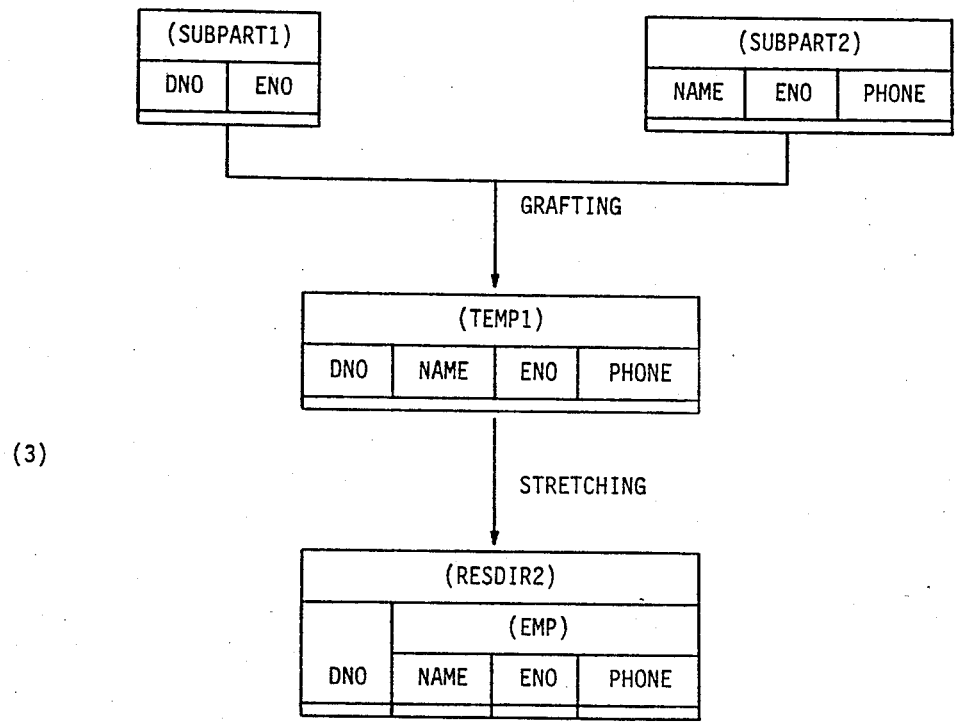

Referring now to FIG. 15 when taken together with FIGS. 16 and 17, there are shown input and output structures when some of the matching fields are not at the root level of the output. When this situation exists, it is necessary according to the method of this invention to create an intermediate file to hold the results of the grafting operation. The intermediate file is prepared by first copying the structure of the target output, followed by pushing all matching fields to the root level. During the push, siblings and descendants of the matched fields are carried along as a unit. The problem is now reduced to grafting where all matched fields are at the root level. This has been previously described. What remains to be done is to apply a stretching operation to transform the output of grafting into the final output.

The steps of the method of this invention are able to perform data restructuring of varying degrees of complexity because they are dependent only on the prespecified input and output data structures. Since both the input and output data structures may have hierarchical structures of arbitrary complexity, it is believed that the method is applicable over a significant range of applications.

I claim:

1. In an electronic information processing system where input and output data structures are prespecified, a method for generating object code, which object code conforms the input data into the output data structure at execution time, comprising the steps of:
   (a) ascertaining in said system the shape of a given input and output data structure as being either (1) of a flat form, (2) of a one-branch form, or (3) of a tree form;
   (b) determining in said system a minimal subset of operations selected from a set of operations consisting of trimming, flattening, grafting, or stretching for conforming the input into the output data structure according to the difference in ascertained shapes;
   (c) determining in said system each instance when a selected operation is to be invoked; and
   (d) executing in said system the order of operations specified by steps (a) through (c) upon said input data structure.

2. A method according to claim 1, wherein in step (c) where the output data structure is more complex than the input, then recursively decomposing in said system the output structure into its component flat, one-branch, or tree forms; and wherein in step (d) the decomposed forms being combined, step by step, in said system to synthesize the output data structure.

3. A method according to claim 1, wherein in order to invoke the trimming operation, the complexity ranking of the input must be greater than or equal to that of the output data structure, for all components of the output structure their hierarchical level must be the same as the corresponding component in the input structure, and, the parent of each component in the output must be the same as the parent of the corresponding component in the input.

4. A method according to claim 1, wherein in order to invoke the flattening operation, the output structure must have fields all of the same nonhierarchical order, all components required for producing the output are members of one branch of the input structure, and there does not exist any skipping of hierarchical levels among the required components of the input structure.

5. A method according to claim 1, wherein in order to invoke the stretching operation, the output components constitute a branch and all the components required to produce the output structure are at the root level of the input structure.

6. A method according to claim 1, wherein in order to invoke the stretching operation, the root level components of the input form new hierarchical relationships in the output, whereas all other components maintain parent-child relationships "consistent" among corresponding components of input and output structures.

7. A method according to claim 1, wherein in order to invoke the grafting operation, two appropriate input structures, matched on prespecified fields, are combined side by side, wherein each of the appropriate input structures being either the prespecified input structure or a transformed structure.

8. A method according to claim 2, wherein in the decomposition phase, the steps include decomposing in said system the output structure into its subtrees, concatenating in said system each of the subtrees with its parent key fields; forming in said system an intermediate file thereof; and comparing in said system said intermediate file with its counterpart in the input structure.

9. A method according to claim 2, wherein during the synthesis phase, the steps include ordering in said system the operations to produce an intermediate file from the input structure in a top-to-bottom, left-to-right order; and grafting in said system the intermediate files in a pairwise bottom-up, right-to-left order until the desired output structure is produced.

* * * * *